United States Patent Office
3,822,165
Patented July 2, 1974

3,822,165
SHAPING DRUM
William C. Habert, Fraser, Mich., assignor to
Uniroyal Inc., New York, N.Y.
Filed Feb. 16, 1973, Ser. No. 333,265
Int. Cl. B29h 17/16
U.S. Cl. 156—415     10 Claims

ABSTRACT OF THE DISCLOSURE

A tire building machine having a shaping drum formed from two variably spaced housings coaxially disposed with respect to each other and having means for direct inflation of a first stage carcass supported thereon. Each housing having fingers disposed around its circumferences which controls the position of an elastomeric bladder for sealing by engaging the beads of the carcass.

BACKGROUND OF THE INVENTION

This invention relates to a tire building machine and more particularly to a tire building machine having an improved tire carcass shaping drum.

In the building of tires having breakers or belts incorporated in the crown area of the tire, as in the case of radial ply, belted tires for example, a two stage process is conventionally employed. During the first stage of building, a cylindrical carcass is formed having (1) one or more rubber covered cord plies wound around and interconnecting axially spaced, parallel, coaxial, bead cores and (2) a layer of rubber sidewall stock on each sidewall area of the carcass, intermediate the eventual crown area thereof and the two bead areas thereof. Such a carcass is referred to herein as the "first stage carcass." During the second stage of building, the shape of the first stage carcass is changed from a cylinder to a toroid and one or more rubber covered cord breaker plies and a rubber tread slab are added to the crown portion of the carcass to form what is referred to herein as the "second stage carcass." The term "rubber" as used herein is intended to cover natural rubber, man-made rubber and rubbery materials. The term "cord" as used herein is intended to cover single and multiple strands, filaments, wires or cables of natural and synthetic textile materials such as cotton, rayon, nylon, polyester, glass fiber, and the like, metal and/or such other materials as may be used as reinforcements in pneumatic tires.

A number of machines have heretofore been developed which are utilized in bulding second stage carcasses in accordance with the general process referred to above. For example, U.S. Pat. No. 3,125,482 to W. Niclas et al., dated Mar. 17, 1964 discloses a machine where the cylindrical shape of the first stage carcass is changed into the toroidal shape of the second stage carcass on an inflatable drum. This drum comprises spaced, movable end plates and a cylindrical rubber diaphragm, the diaphragm and end plates together defining an inflatable chamber. Upon concurrent axial movement of the end plates toward each other and pressurization of the inflatable chamber, the first stage carcass mounted on the drum undergoes a change of shape to arrive at the shape of a second stage carcass.

In the aforesaid machines, a breaker-tread assembly is carried on the inner surface of a transfer ring to a position encircling the eventual crown area of the first stage carcass on the inflatable drum. When the inflatable drum is expanded the crown area of the carcass thereon expands into pressurized contact with, and adheres to, the inner surface of the breaker-tread assembly to form the second stage carcass. The transfer ring is then expanded to release it from contact with the breaker-tread assembly and, finally, is moved clear of the second stage carcass, allowing removal of the carcass from the inflatable drum following deflation of the latter. It is, of course, very difficult to manufacture the rubber diaphragms in such manner that they will assume an exactly predictable shape and size when expanded. Moreover, such diaphragms must be frequently replaced at substantial expense.

Although commercially acceptable tires can be made on tire machines using the above process, the tires made on such machines tend to lack uniformity from one to another and have a high scrappage range. This is caused among other things, by distortion and stretching of the various elements of the first stage carcass as these elements are manipulated on the shaping drum.

Another machine utilized in the building of second stage carcasses is described in U.S. Letters Patent No. 3,676,262 issued July 11, 1972. The latter machine does not require an inflatable diaphragm. A pair of variably spaced carcass support discs are provided for supporting the beads of the tire carcass during toroidal shaping of the latter. The discs are of generally fixed diameter and form an integral seal with the beads. The shaping is accomplished by forcing air under pressure into the chamber formed by the carcass and the discs. In operation, the first stage carcass must be manipulated into proper position on these discs and the second stage carcass must be manipulated to remove it from the discs. Such manipulation, if not carefully done, can result in distortion and stretching of certain of the component elements of the carcass.

U.S. Letters Patent No. 3,580,782, issued May 28, 1971, discloses a shaping drum which overcomes some of the disadvantages inherent in the shaping drum described in U.S. Letters Patent No. 3,676,262. Briefly, the shaping drum has a pair of radially expansible and contractable coaxial tire carcass support rings and a sealing means in the form of a pair of endless elastically deformable bands, each trained around one of the rings and when the rings are extended, adapted to form a fluid tight seal with the beads of the tire carcass. This forms a fluid tight chamber within the interior of the carcass. In operation, shifting means cooperate with the rings to axially shift the latter toward and away from each other and a fluid pressure source, communicating with the interior of the carcass, supplies fluid into the chamber formed by the carcass and shaping drum so as to radially expand the mid portion of the carcass while the rings are moved toward each other. This improvement eliminated the danger of distortion inherent in the prior method. There are, however, disadvantages in the use of this shaping drum. Firstly, the shaping drum cannot be rapidly and easily adapted for use on carcasses having different bead diameters. This can cause long delays when, in the normal course of production, it is necessary for the machine to build different size tires. Secondly, this arrangement requires the use of shaping rings or molds positioned around the outside of the carcass to assist in maintaining the carcass beads against the bands. Thirdly, with this drum, a chain and lever linkage used to raise the rings in coordination with their axial movement, i.e., the axial movement of the rings tighten and loosen the chain which radially raises and lowers the rings. It is therefore important that a precise relationship exist between the axial position of the rings and the chain and lever linkage in order to effectuate the proper setting of the beads on the band. Finally, as the final step in the operation cycle, the rings must be moved axially close together to trip a release of the linkage allowing the rings to return to their down positions. This makes a wasteful extra step in the operational cycle of this machine.

SUMMARY OF THE INVENTION

Accordingly, the primary object of my invention is to eliminate the foregoing disadvantages.

Another object of this invention is to provide a tire building machine having an improved shaping drum which permits a first stage carcass to be positioned thereon and a second stage carcass to be removed therefrom, all without deformation, distortion or stretching of the component elements of the carcass.

A still further object of this invention is to provide a tire building machine having a shaping drum which can be rapidly adjusted to make tires of the different bead diameters.

Yet another object of the present invention is to provide a tire building machine having a shaping drum which has independent axial and radial movement eliminating the need for precision linkage between the component elements and the need for wasteful extra steps in the operational cycle of the device.

An additional object of the invention is to provide a tire building machine having a shaping drum which so securely seats the tire carcass beads that shaping rings are not needed to assist in maintaining a fluid tight seal.

In accordance with one embodiment of this invention, a shaping drum is composed of two axially spaced cylindrical housings for support and shaping of a first stage carcass. Each housing has a sealing means in the form of a series of circumferentially spaced fingers pivotally mounted thereon. The pivot points of the fingers are at the ends of the fingers closest to the center of the shaping drum. The ends of the fingers in each housing farthest from the center of the shaping drum are joined along their outer circumference by a thin, endless, deformable, elastomeric bladder. The bladder is highly flexible and is adapted to seal each housing to a bead of a first stage carcass when the fingers are in an outwardly extended or "up" position. Since the bladder is thin and flexible, a good seal is made regardless of irregularities on the inner wall of the bead area of the carcass. This forms a chamber into which a fluid under pressure may be introduced while the housings are moved toward each other to form the second stage carcass. The fingers and bladder are of such design as to allow rapid exchange for others to adapt the drum for use with carcasses of different bead diameters.

BRIEF DESCRIPTION OF DRAWINGS

While the specification concludes with claims particularly pointing out and distinctly claiming the subject matter regarded as this invention, it is believed that the invention will be better understood from the following description, taken in connection with the accompanying drawings in which:

DESCRIPTION OF THE PREFERRED EMBODIMENT

Figure 1:
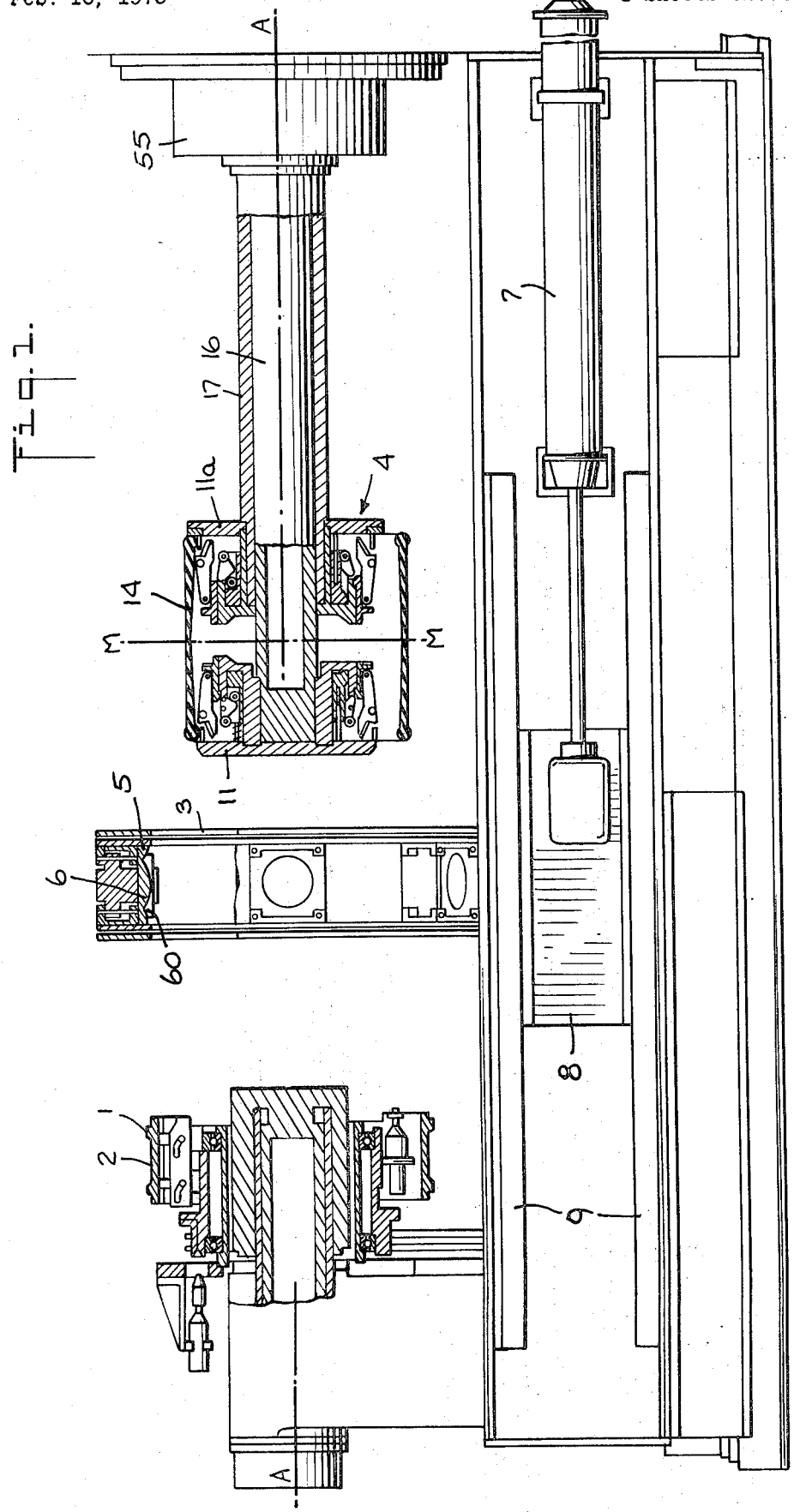
FIG. 1 is a side elevation view, with parts cut away for clarity, of a tire building machine having a shaping drum embodying the present invention.

Referring now to FIG. 1, a tire building machine having a shaping drum in accordance with one embodiment of this invention is illustrated. The tire building machine has a radially expansible and contractable building drum 1 upon which the breaker-tread assemblies are formed. These assemblies are constructed in the recessed or grooved outer surface 2 of the building drum. A driving means (not shown) is provided, including an electric motor, a suitable reduction gear and an electromagnetic clutch means, for rotating the drum.

A transfer ring 3 is provided for transferring the breaker-tread assemblies formed on drum 1 to a tire carcass shaping drum 4. The transfer ring 3 is provided with a radially expansible and contractable ring 5 the contour of the inner surface 6 of which conforms generally to the outer surface contour of the tread portion of a breaker-tread assembly 60 mounted on the transfer ring 3. The transfer ring 3 is shifted from the position shown in FIG. 1 to a position in vertical alignment with the building drum 1 or with the carcass shaping drum 4 by means of a hydraulic power cylinder 7. The piston rod of cylinder 7 is connected to a sliding block 8 which moves in a guide 9, the sliding block 8 being rigidly interconnected with and serving as the support for the transfer ring 3.

Transfer ring 3 is provided with suitable means for radially contracting its ring 5 into contact with the outer surface of a breaker-tread assembly 60 on the building drum 1. In building a tire, after the ring 5 is moved radially inwardly into contact with the breaker-tread assembly 60, the building drum 1 is radially contracted to transfer sole control over the breaker-tread assembly to the transfer ring 3. Thereafter, this ring is axially shifted to the right, as viewed in FIG. 1, into vertical alignment with the median plane of M—M of a first stage carcass 14 mounted on the carcass shaping drum 4. A fluid tight seal has already been made between the carcass 14 and the shaping drum 4. The carcass 14 is than inflated with a fluid under pressure. Concurrently with such inflation, housings 11 and 11a of the shaping drum 4 are axially moved closer to the medium plane M—M. As a result, the first stage carcass expands into contact with the interior of the breaker-tread assembly 60, carried in transfer ring 3.

As seen in U.S. Pat. 3,580,782, shaping rings are normally pressed against the edges of the carcass concurrently with the movement of the housings 11 and 11a to assist in the sealing of the carcass beads to the shaping drum. The shaping drum of the present invention, as will be more fully disclosed hereinafter, however seats the tire so securely that such assistance is not needed to effectuate and maintain a seal. After the breaker-tread assembly 60 and the carcass 14 are in good adhering contact with one another, the pressure in the carcass 14 is released; the ring 5 of the transfer ring 3 is expanded radially outward to free it from contact with the tread portion of the breaker-tread assembly; and the transfer ring 3 is shifted axially out of alignment with the plane M—M, clear of the carcass. The shaping drum 4 is then rotated to allow the breaker-tread assembly to be stitched to the carcass. Thereafter, the carcass is removed from the machine and the machine is returned to its original position. The shaping drum 4 is now ready to be recycled for the building of another second stage carcass.

Figure 2:
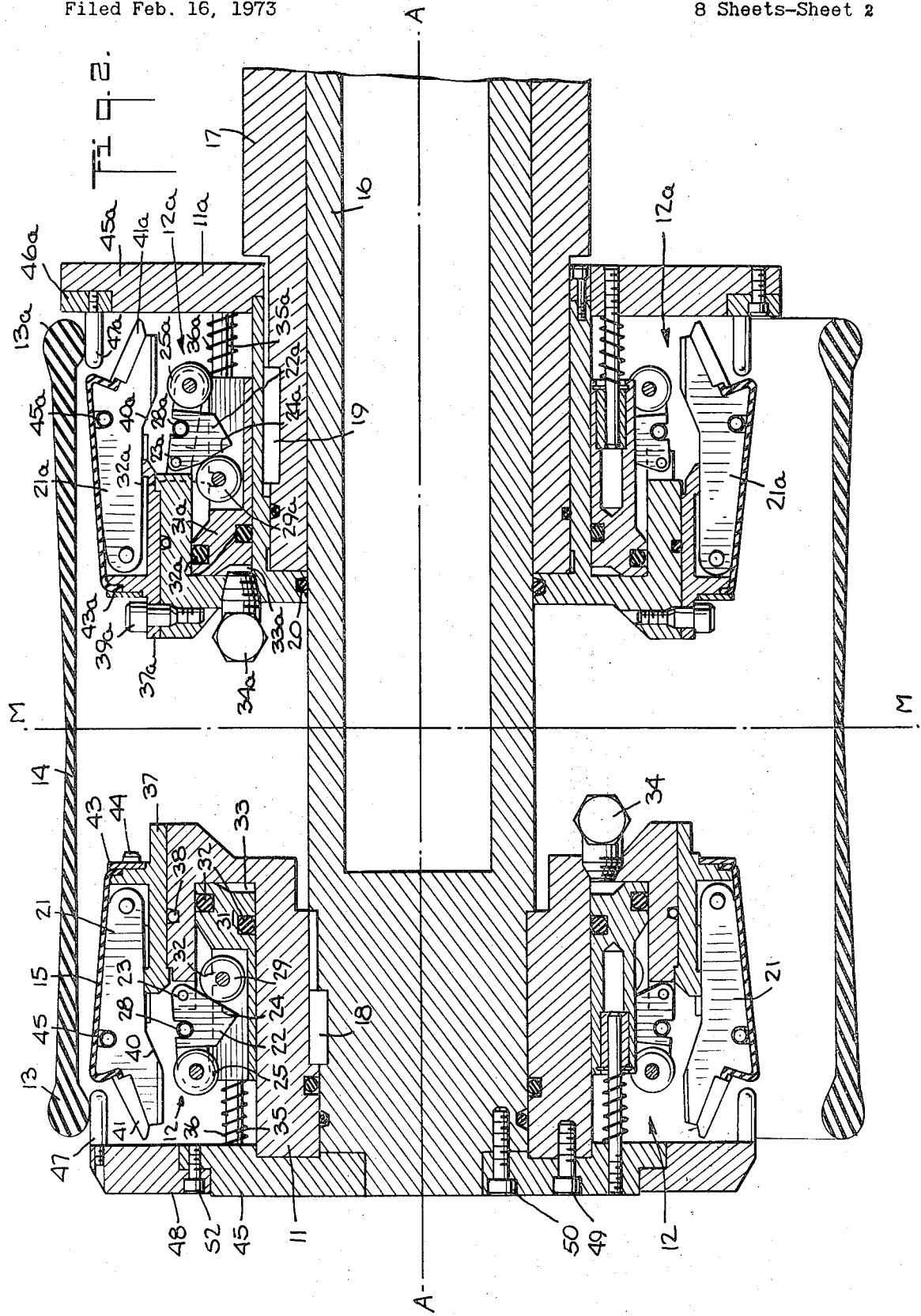
FIG. 2 is a sectional elevation view of the shaping drum according to the present invention showing the latter in the load position of operation.

The present invention is concerned with an improved shaping drum for use in a tire building machine such as the one described above, or in other similar machines. The shaping drum 4 of the present invention, as can be seen in FIG. 2, comprises two cylindrical housings 11 and 11a which are positioned on the same axis A—A as the transfer ring 3. Since, to a large extent, the housings are symmetrical with regard to plane M—M, identical parts on opposite sides of plane M—M have been given identical numerals, differing only in the addition of the suffix "a" to parts right of plane M—M. The housing 11 and 11a, as can more clearly be seen in FIGS. 2–5, are provided with radially expansible and collapsible means 12 and 12a which cooperate with the bead areas 13 and 13a of the first stage carcass 14 in supporting the carcass 14 on the shaping drum 4. While a flat built carcass 14 has been illustrated in the drawings, the present invention may equally well be used with a shoulder built carcass. The housings 11 and 11a also include annular sealing bladders 15 and 15a, respectively, formed from a thin sheet of elastomeric material, such as urethane or rubber. The sealing bladders 15 and 15a are adapted to engage the inner surface of the bead areas 13 and 13a of a first stage carcass 14 mounted on the housing 11 and 11a.

The construction of the expandable and collapsible means 12 and 12a, which will be described in detail below, is such as to position the sealing bladders 15 and 15a against the carcass providing continuous peripheral contact between the bead areas 13 and 13a of the carcass 14 and the bladders 15 and 15a. Since the bladders 15 and 15a are formed from a thin flexible elastomer material, the bladders readiy conform to the contours of the bead areas of the carcass and make a fluid tight seal with them. As discussed above, this allows the carcass 14 to be inflated by a fluid, such as air, under pressure and thus have its shape changed from a cylindrical to a toroidal form. The housings 11 and 11a are movable with respect to each other along axis A—A to accommodate different size carcasses and to facilitate the shaping of first stage carcasses into second stage carcasses, as will be more fully disclosed below.

The relative movement between housings 11 and 11a along the axis A—A is preferably obtained by mounting housings 11 and 11a on concentric quills 16 and 17. As can be seen in FIG. 2, housing 11 is mounted to the inner quill 16 by key 18 or other suitable means and housing 11a to the outer quill 17 by means of key 19. Quill 17 is splined to and slideably mounted on inner quill 16 to prevent rotational movement between while allowing movement along the quills 16 and 17. Housing 11a is also in contact with quill 16 at sealing rings 20 inserted in a circumferential recess in housing 11a. Thus the relative axial position of housing 11 and 11a can be controlled by means of quills 16 and 17. The quills 16 and 17 are axially moved by positioning means 55. Positioning means 55 can also act to rotate the shaping drum and thus allow the breaker-tread assembly to be stitched to the carcass.

As noted previously to a large extent the components of housing 11 and 11a are symmetrical on the plane M—M. Therefore, for the sake of brevity, only one of each set of symmetrical pairs will be described below, unless otherwise indicated.

Figure 6:
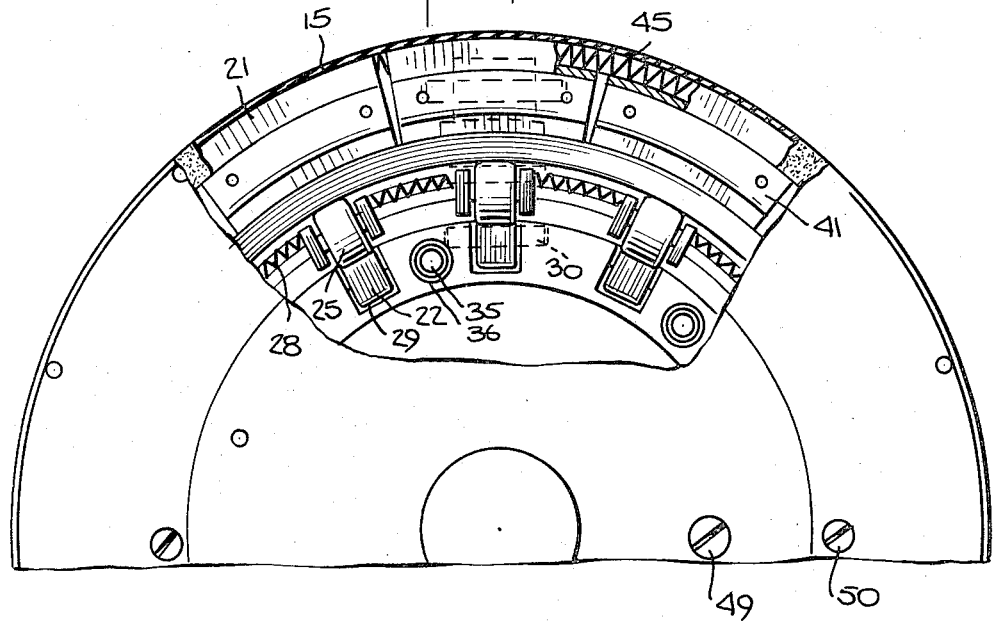
FIG. 6 is a front elevation view, with for clarity, parts cut away and without a carcass mounted thereon, of a shaping drum according to the present invention, showing the latter in its load position.
Figure 7:
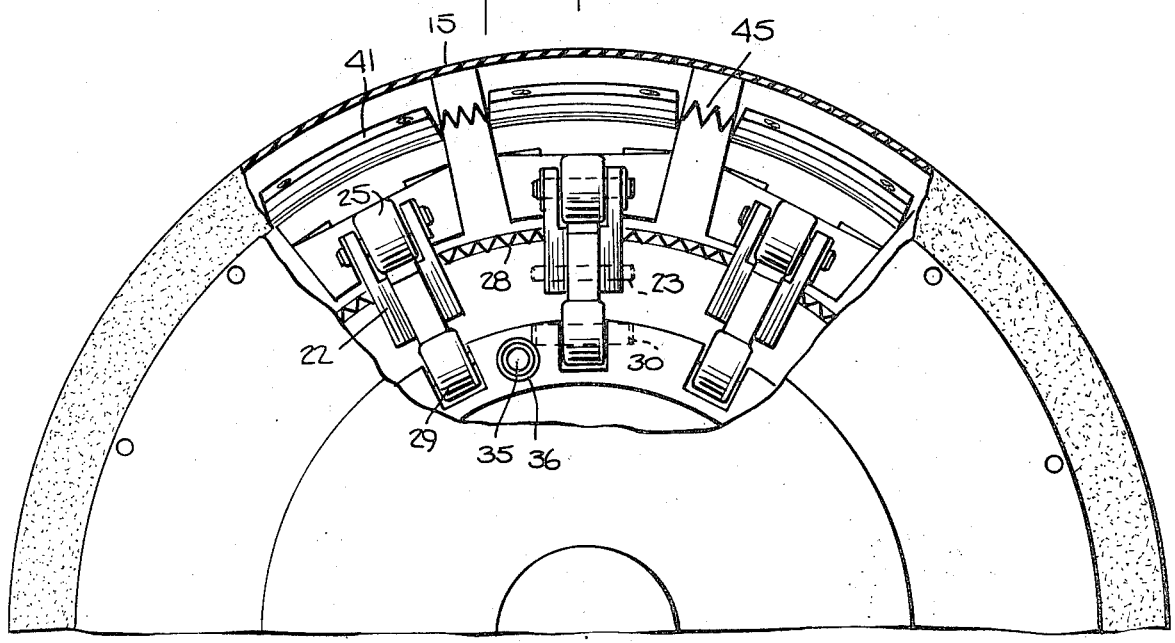
FIG. 7, is a front elevation view, with, for clarity, parts cut away and without a carcass mounted thereon, of a shaping drum according to the present invention, showing the latter with the fingers in the extended position.

The expansible and collapsible means 12 consists of a series of fingers 21 and related means for positioning the fingers 21 spaced circumferential around the housing 11 (see FIGS. 6 and 7). More specifically, as can be clearly seen in FIGS. 2 and 11, the position of fingers 21 are controlled by lifters 22. Each lifter 22 is pivotably connected to housing 11 by a retainer pin 23. Each lifter 22 has a cam shaped profile 24 along its inner surface and a cam roller bearing 25 mounted in brackets 26 on the end of the lifter 22 farthest from its retainer pin 23. A recess 27 in the upper portion of each lifter 22 contains a garter spring 28 which circumjoins the lifters in housing 11, thereby establishing a return position for the lifters 22. Each lifter 22, together with its cam roller bearing 25 is positioned by the motion of cam roller bearing 29 along the cam shaped profile 24 of lifter 22. Each cam roller bearing 29 is rotatably mounted on a fixture pin 30 which is in turn mounted in a trench groove 32 in ring piston 31.

Figure 11:
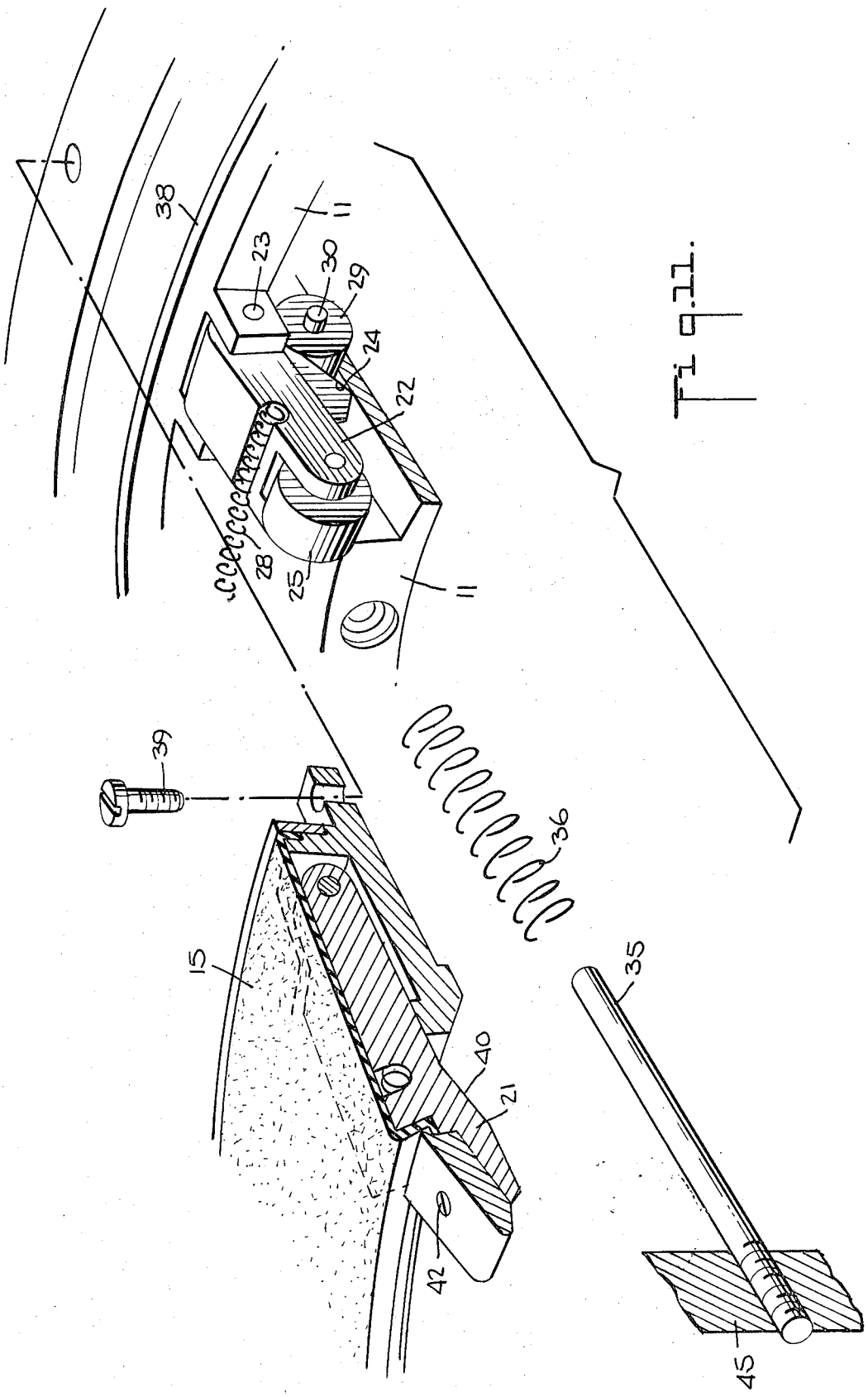
FIG. 11 is an exploded view of one of the expandable and collapsible means according to the present invention together with a portion of the bladder associated therewith.

As can be seen in FIGS. 2 and 11, ring piston 31 is axially slidably mounted on housing 11 with a sealing ring 32 inserted in a circumferential recesse to seal the piston 31 to the housing 11. Each ring piston 31, in conjunction with housing 11, forms a ring cylinder chamber 33. Each such ring cylinder chamber 33 is connected to a source of fluid under pressure 34. Pin 35 and spring 36 act as a guide and as a return means respectively for the ring piston 31. Thus, each cam roller bearing 29 can be made to act on the cam shaped profile 24 of its respective lifter 22 by introduction of a fluid under pressure in the ring cylinder chamber 33. The introduction of the fluid causes chamber 33 to expand by the ring piston 31 axially sliding outward, that is away from plane M—M. This results in imparting motion to cam bearing 29 which in turn imparts motion to lifter 22 through cam surface 24. After the fluid is released, spring 36 acts to return each ring piston 31 to its starting position.

As seen in FIGS. 2 and 11, all the fingers 21 in housing 11 are pivotally mounted on a finger retaining ring 37. Finger retaining ring 37 is slidably mounted on housing 11. The finger retaining ring 37 and the housing 11 are fluidly sealed by means of sealing rings 38 inserted in a circumferential recess in housing 11. The finger retaining ring 37 is fixed in position on the housing 11 by means of shoulder screw 39 (see FIGS. 2, 8 and 11).

When the finger retaining ring 37 is properly positioned, each of the fingers 21 is in alignment with a lifter 22. The alignment is such that the roller bearings 25 of the lifter 22 can be brought into contact with the inner or guide surface 40 of the finger 21 through the normal cooperation of the lifter 22, the roller bearing 29, and ring pistons 31.

Each of the fingers 21 has a steel shoe 41 upon which the carcass bead 13 can be seated in a manner to be described later. Each steel shoe 41, by means of screws 42, secures to each finger the outer edge of bladder 15 (i.e., the edge farthest from plate M—M) which circumferentially encloses all the fingers 21 mounted on housing 11. The inner edge of the bladder 15 (i.e. the edge closest to plane M—M) is secured to the finger retaining ring 37 by flat ring 43 and screws 44. Beneath the bladder 15, each finger 21 has a groove in which the garter spring 45 is seated to circumjoin all of the fingers in housing 11.

Figure 8:
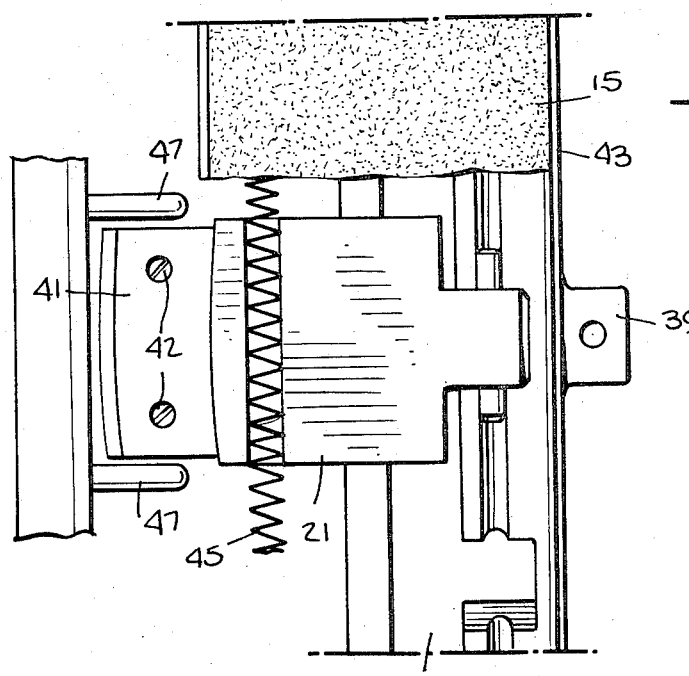
FIG. 8 is a top elevational view, with, for clarity, parts cut away and without a carcass mounted thereon, of a portion of a shaping drum according to the present invention, showing the latter in its load position.

Housing 11a has a flat ring cover 45a which has an annulet 46a spliced into a radially outward and axially inward circular recess. Annulet 46a has pins 47a disposed around its circumference and jutxaposed accurately to either side of fingers 21a, as is illustrated in FIG. 8, so that there are as many pins 47a as fingers 21a. Similarly, housing 11 has a cover comprised of two flat rings 45 and 48. Ring 45 is located axially adjacent the inner quill 16 and is attached to the main body of the housing 11 by thread screw means 49 and to the quill 16 by screw means 50. The outer diameter of flat ring 45 is less than the inner diameter of the retaining ring 37 to allow removal of retaining ring 37 as will be more fully discussed below. Flat ring 48 is positioned radially outward from and on flat ring 45. It is attached to flat ring 45 by means of screw means 52. The outer diameter of flat ring 48 should be selected so that the cylindrical shaped first stage carcass may be shifted axially thereover, without interference, into the position illustrated in FIG. 2. Protruding from flat ring 48 are pins 47 which are relatedly positioned in relationship to the fingers 21 as pins 47a are to fingers 21a. The pins 47 and 47a are designed to support carcass bead areas 13 and 13a until fingers 21 and 21a lift the carcass radially outwardly from the pins 47 and 47a.

Figure 9:
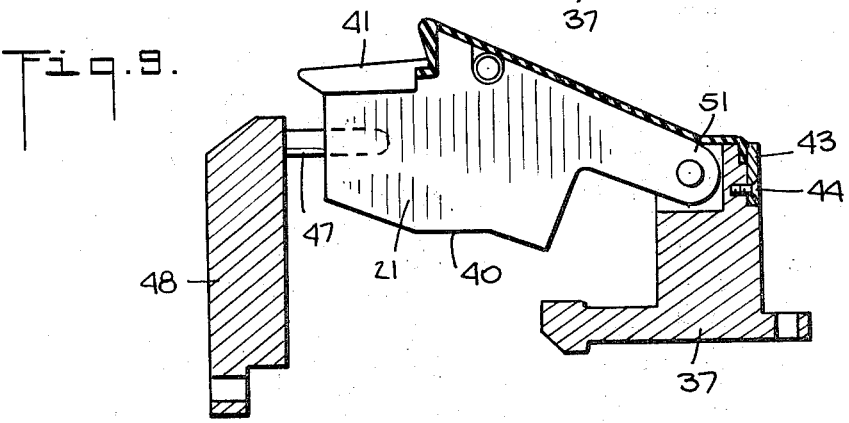
FIGS. 9 and 10 are side elevation view of replacement fingers and flat rings with pins for use with tires of different bead diameters.
Figure 10:
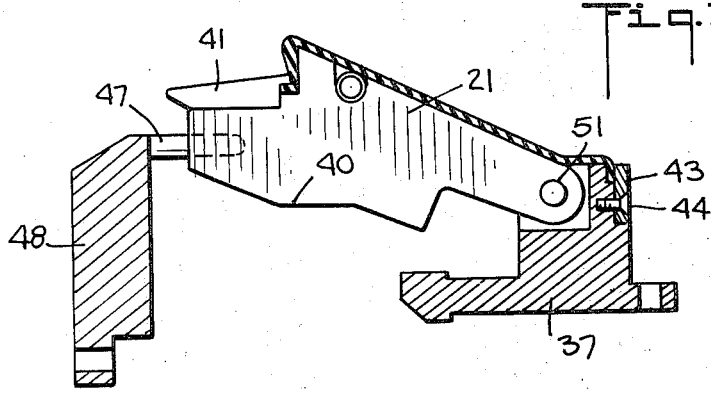

It is, of course, advantageous to be able to rapidly and easily adjust a shaping drum to receive carcasses having different bead diameters. Prior to the present invention there was no means for rapidly making this adjustment. As noted above, in the present invention the seal between the carcass and the shaping drum is made by bladder 15 radially expanding to engage the carcass beads through the action of fingers 21. For any given bead diameter, all the fingers 21 of housing 11 would have the same shape. The profile of the fingers 21 determines the radial position of the bladder 15. Thus, if one wished to then convert the shaping drum 4 for use with a carcass of smaller bead diameters, one need only replace the fingers 21 with ones shaped to correctly position the bladder for the smaller carcass. See FIGS. 2, 9 and 10 for illustrations of fingers designed for use with carcass having different bead diameters.

The exchange of fingers 21 and 21a may be easily and rapidly accomplished in the present invention. To change the fingers 21 and 21a in housings 11 and 11a, one removes concentric flat ring 48 from housing 11 by releasing screw means 52. Thereafter the finger ring 37 may be removed by releasing screw means 39 and axially sliding the retaining ring 37 over flat ring 45 of the housing 11. Thereafter the fingers 21a may be removed from housing 11a, by axially sliding retaining ring 37a, after removing screw means 39a, over the remaining portion of housing 11. New retaining rings 37 and 37a having fingers 21 and 21a of different profiles may then be mounted in the housings 11 and 11a by simply reversing the above procedure. By this method, not only may fingers 21 of different profiles be substituted but the height of the pivots 51 and 51a may also be changed by changing the profiles of retaining rings 37. The different profiles and different pivot points may require that the pins 47 and 47a also be adjusted for different bead diameters. This may be accomplished by the replacement of the flat rings 46a and 48 with ones of different configuration (See FIGS. 2, 9 and 10). In this manner the shaping drum 4 may be rapidly adjusted for carcass of different bead diameters thus preventing costly periods of time when the shaping drum is inoperable during alterations for use on carcasses of different bead diameters.

OPERATION

In describing the operation of the shaping drum 4 of the present invention, we will start at the point in the operation cycle where the elements of housings 11 and 11a are positioned as illustrated in FIG. 2 and the first stage carcass 14 is about to be mounted on the shaping drum 4. This may be accomplished in one of two ways.

In the first method the carcass 14 is shifted axially onto the shaping drum 14 so that it is resting on pins 47 and 47a as illustrated. The bead 13a is positioned against flat ring 46 and the housings 16 and 17 are spread apart the correct distance to allow bead 13 to be properly positioned over the bladder 15 (i.e. positioned so that the bead 13 will be properly mounted on the fingers 21 when they are expanded, as will be more fully disclosed hereinafter).

Figure 3:
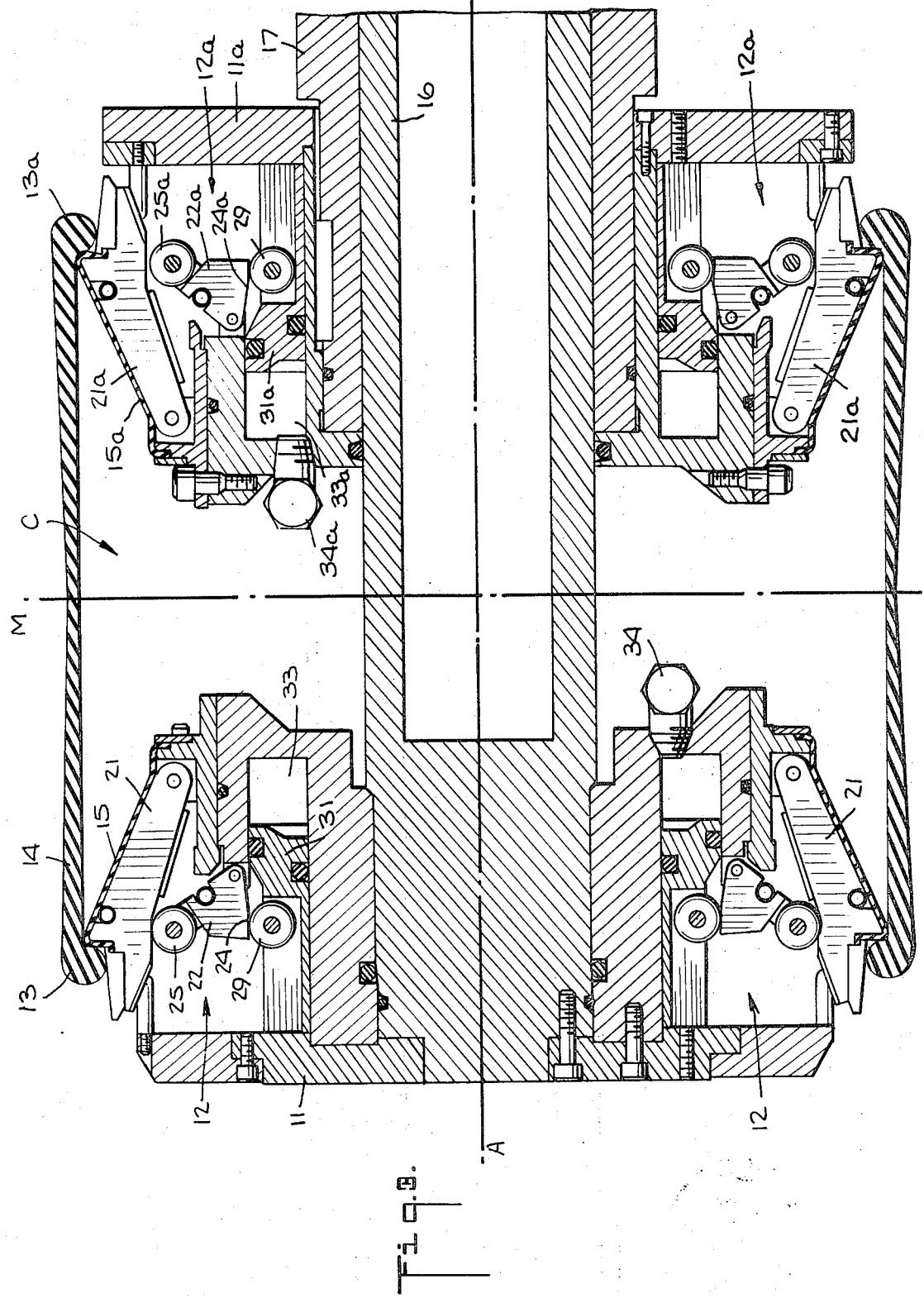
FIG. 3 is a sectional elevational view of the shaping drum according to the present invention showing the latter with the fingers in the expanded position of operation and the housings axially spaced for proper setting of the carcass shoulder.

In the second and preferable method, the housings 11 and 11a are initially spaced a small distance closer together than in the first method. The carcass is thereafter positioned on the housings 11 and 11a and bead 13a positioned against ring 46 on pins 47a. Fingers 21 and 21a are then expanded. Beads 13 and 13a are held in position by the fingers 21 and 21a while housing 11 and 11a are each moved a small distance axially away from each other to properly positioned bead 13 over bladder 15 by means of quills 16 and 17. This latter method both facilitates the mounting of the carcass and stretches the material of the carcass 14 and insures a tight seal for inflation. In either case, the carcass 14 is finally positioned as shown in FIG. 2. To initiate operation, a fluid, such as air, is introduced into chambers 38 and 38a under pressure. The chambers 38 and 38a expand, moving ring pistons 31 and 31a axially outward. This moves roller bearing 29 and 29a along the cam profile 24 and 24a of lifters 22 and 22a. This, in turn, brings roll bearings 25 and 25a into contact with cam surface 40 and 40a of fingers 21 and 21a. Fingers 21 and 21a are thus pivoted around point 51 and lifted into the "up" position illustrated in FIG. 3. As a result beads 13 and 13a rest on shoes 41 and 41a, respectively, and form a seal with bladders 15 and 15a as can be seen in FIG. 3. Since the bladder is formed from a thin sheet of flexible elastomeric material it conforms to the contours of the carcass regardless of minor irregularities.

Figure 4:
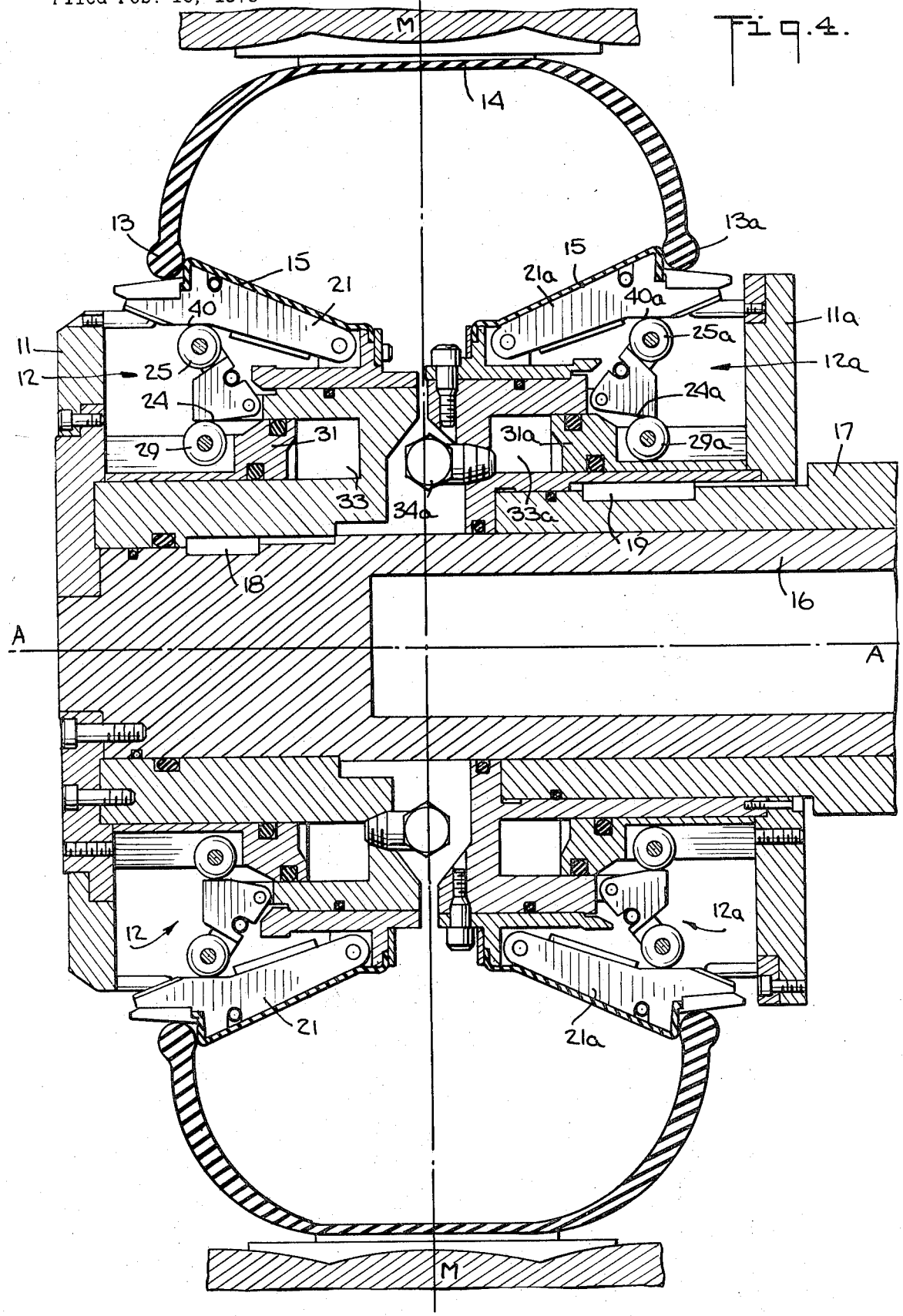
FIG. 4 is a section elevational view of the shaping drum according to the present invention showing the latter in the shaping position of operation thereof and showing also, schematically, the transfer ring cooperating with the apparatus.
Figure 5:
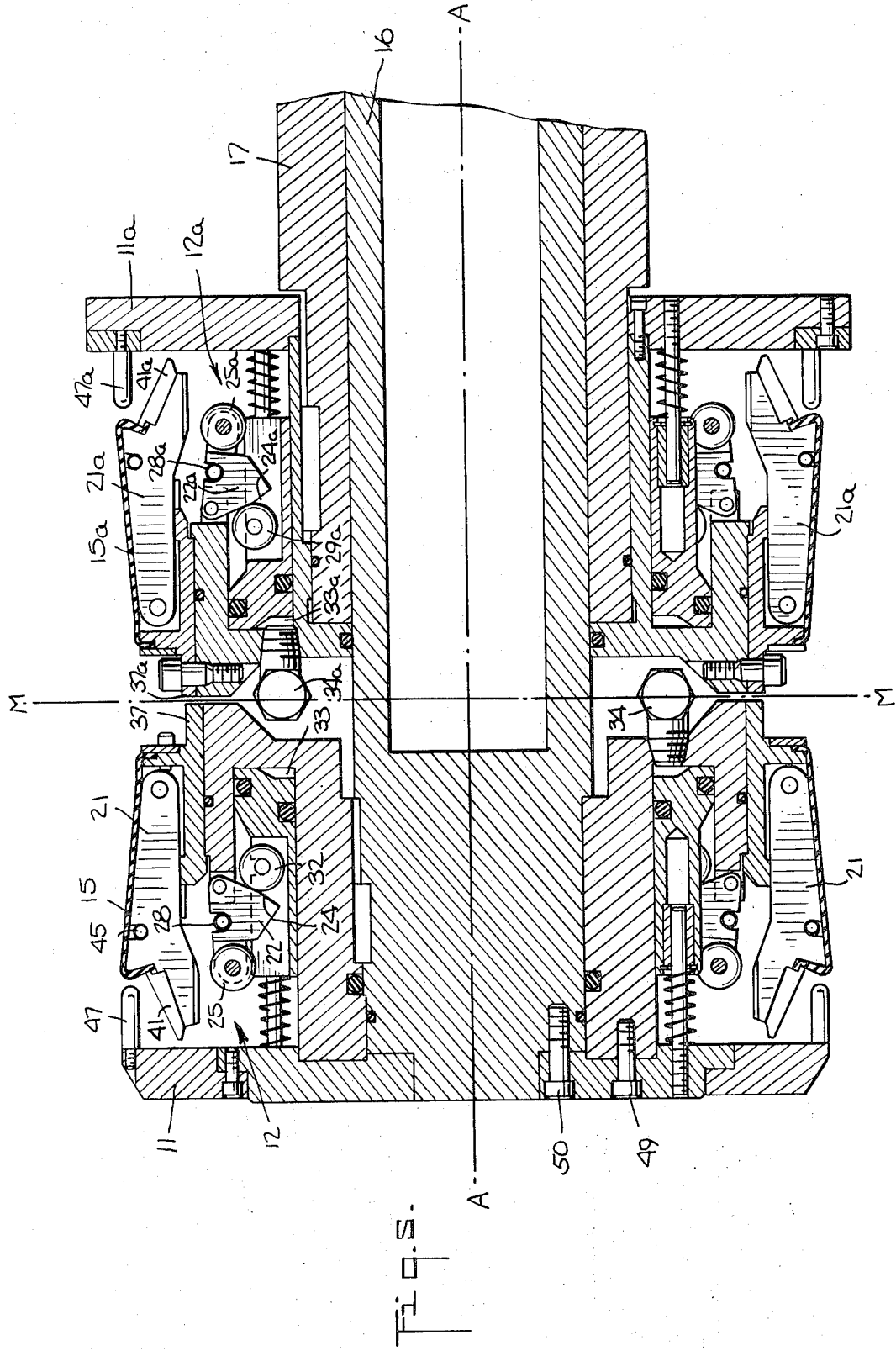
FIG. 5 is a sectional elevational view of the shaping drum in its final position of operation.

Concurrent with the pivoting of fingers 21 and 21a to the "up" position, transfer ring 3 centers a breaker-tread assembly 60 on axis M—M, half way between housings 11 and 11a. Thus the breaker-tread assembly 60, itself circumferentially enclosed in the transfer ring 3, is centered on and concentric with the carcass 14. Thereafter quills 16 and 17 are activated by positioning means 55 to move housings 11 and 11a toward the medium plane M—M. Simultaneously, a compressed fluid, such as air, is introduced into the interior of the chamber formed between the housings 11 and 11a and the carcass 14, by conduits 34 and 34a. Accordingly, the first stage carcass 14 begins to inflate while the housing 11 and 11a are moving toward one another. The final stage of this movement and inflation, when the carcass has been formed into a toroidal form, is illustrated in FIG. 4.

The foregoing approaching movement of housing 11 and 11a during inflation of carcass 14 are symmetrical with respect to the median plane M—M. It continues until the distances between the housings 11 and 11a reach a predetermined value dependent upon the dimensions of the tire being built. During this movement and inflation, the inner surface of the carcass beads 13 and 13a are forced by internal shaping pressures against the sealable bladder 15 and 15a that circumjoins the fingers. The outer surface of the carcass 14 is forced under pressure against the inner surface of the breaker-tread assembly 60 that is being held by the transfer means 3. The latter causes the outer surface of the carcass 14 and the inner surface of the breaker-tread assembly 60 to adhere to one another. Thereafter the shaping drum 4 and the carcass 14 may be rotated by positioning means 55 to allow the breaker-tread assembly 60 to be stitched to the carcass by a conventional roller stitching machine (not shown) to cause greater adherence of the breaker-tread assembly to the carcass.

In this manner, the first stage carcass 14 has been transformed into a second stage carcass. This carcass may be removed from the shaping drum 4 by exhausting the excess air or other fluid from the chamber formed by the carcass and the shaping drum 4 and from chamber 33 and 33a. Upon exhaustion of the excess air in chambers 33 and 33a, the action of springs 36 and 36a force the ring piston back to a position closer to the plane M—M. This moves roller bearing 29 back across the cam profile 24 and 24a of lifters 22 and 22a. Thus allowing the lifters 22 and 22a, under the urging of springs 28 and 28a, to resume their original position. This in turn allows fingers 21 and 21a to be lowered by actions of spring 45 and 45a and the rubber bladder 15 and 15a. See FIG. 5. Once the seal has been broken by the lowering of fingers 21 and 21a, the tire may be removed from the shaping drum and the housing 11 and 11a moved by quills 16 and 17 to a position for receiving a new first stage carcass.

It will be understood by those skilled in the art that suitable conventional electrical and fluid circuits would be employed in the foregoing tire building machine to automatically or manually regulate the various movements of the various parts of the machine as well as to synchronize the operation of the various components of the machine with respect to one another.

While particular embodiments of this invention have been shown and described, it will be obvious to those skilled in the art that various changes and modifications may be made without departing from this invention in its broader aspects, and it is, therefore, intended in the appended claims to cover all such changes and modifications as fall within the true spirit and scope of this invention.

What is claimed is:

1. A shaping drum comprising, in combination:

two housing means coaxially disposed with respect to each other, each of said housing means having circumferentially disposed radially expansible and contractible fingers pivotedly mounted thereon, the pivot points of said fingers being at the ends of the fingers closest to the point midway between the two housings along their common axis;

an endless elastically deformable bladder trained around the radially expansible and contractible fingers on each of said housings, the outer edge of each of said bladders being attached to the edge of the fingers farthest from said midway point;

means for axially moving said housing means toward and away from each other;

and actuating means associated with said fingers for moving the latter between a radially retracted position in which said elastically deformable bladder is in contracted condition for permitting a tire carcass to be axially shifted onto and off said housing means and a radially extended position in which said elastically deformable bladder is in expanded condition for sealingly circumferentially engaging the adjacent bead of the tire carcass positioned therearound.

2. The shaping drum of claim 1 wherein in each of said housing means, the edge of said bladder closest to said midway point is fluid tightly secured to its respective housing means in such a manner that when a tire carcass is mounted thereon and the fingers are in the radially extended position, a fluid tight chamber is formed between the carcass, both housing means and their respective bladders.

3. The shaping drum of claim 2 further comprising a fluid pressure means communicating with said chamber for inflating a carcass mounted on the shaping drum.

4. The shaping drum of claim 1 wherein the radial position of each of the fingers is controlled by a cam means.

5. The shaping drum of claim 4 wherein the movement of said cam means is controlled by a piston means mounted in a fluid tight piston chamber in such a manner that its position is dependent on the amount of fluid introduced into said piston chamber.

6. The shaping drum of claim 1 wherein the fingers mounted on each housing means are disposed around its circumference.

7. The shaping drum of claim 6 wherein the fingers in each of the housing is conjoined by a spring means which acts to urge the fingers into the radially contracted position.

8. The shaping drum of claim 1 wherein the fingers in each housing are attached to a mounting means which is easily detachable from the housing means to allow adjustment of the drum to receive carcasses having different bead diameters.

9. The shaping drum of claim 1 wherein each housing has a series of circumferentially arranged pins mounted thereon to support the carcass bead area when the fingers are in the radially contracted position.

10. The shaping drum of claim 9 wherein the said pins in each housing are mounted on a mounting means which is easily detachable from the housing means to allow adjustment of the drum to receive carcasses having different bead diameters.

References Cited

UNITED STATES PATENTS

| | | | |
|---|---|---|---|
| 3,107,192 | 10/1963 | McNenney | 156—416 |
| 3,184,361 | 5/1965 | Allitt | 156—415 |
| 3,234,070 | 2/1966 | Pouilloux | 156—415 X |
| 3,433,695 | 3/1969 | Caretta et al. | 156—416 X |
| 3,475,254 | 10/1969 | Henley | 156—416 X |
| 3,485,692 | 12/1969 | Frazier | 156—416 X |
| 3,518,149 | 6/1970 | Mirtain | 156—416 |
| 3,580,782 | 5/1971 | Leblond | 156—415 |
| 3,740,293 | 6/1973 | Jones et al. | 156—415 |
| 3,765,987 | 10/1973 | Brey | 156—415 |
| 3,767,509 | 10/1973 | Gazuit | 156—415 |

CLIFTON B. COSBY, Primary Examiner

U.S. Cl. X.R.

156—416

UNITED STATES PATENT AND TRADEMARK OFFICE
CERTIFICATE OF CORRECTION

PATENT NO. : 3,822,165
DATED : July 9, 1975
INVENTOR(S) : WILLIAM C. HABERT

It is certified that error appears in the above-identified patent and that said Letters Patent are hereby corrected as shown below:

Col. 4, line 53, replace "than" with --then--.

Col. 4, line 55, replace "medium" with --median--.

Column 8, lines 9 and 10, replace "38 and 38a" with --34 and 34a--.

Column 8, line 33 replace "34 and 34a" with --(not shown)--.

Signed and Sealed this eighteenth Day of November 1975

[SEAL]

Attest:

RUTH C. MASON
Attesting Officer

C. MARSHALL DANN
Commissioner of Patents and Trademarks